April 26, 1960          D. T. LONGLAND          2,934,698

MAGNETIC CONTROL APPARATUS

Filed Dec. 3, 1956          2 Sheets-Sheet 1

*INVENTOR.*
DONALD T. LONGLAND

BY *Joseph E. Ryan*

*ATTORNEY*

INVENTOR.
DONALD T. LONGLAND
BY Joseph E. Ryan
ATTORNEY

United States Patent Office 2,934,698
Patented Apr. 26, 1960

2,934,698

MAGNETIC CONTROL APPARATUS

Donald T. Longland, Sudbury, Mass., assignor to Minneapolis-Honeywell Regulator Company, Minneapolis, Minn., a corporation of Delaware Application December 3, 1956, Serial No. 625,953

7 Claims. (Cl. 324—41)

My invention relates to magnetic control apparatus and more particularly to an improved apparatus for detecting the presence of an article having magnetic properties or electrically conductive properties.

Present day manufacturing methods are directed toward mass production with the use of as many automatic controlled features as are possible to eliminate manual handling of parts and the human error attended thereto. In most of these manufacturing procedures, parts making up the completed unit are added to a basic element or certain operations are performed on a basic element at varying stations positioned along an assembly line. The basic element is normally conveyed from station to station on a conveyor of some sort which in most cases is not a continuously moving one but rather one which moves a predetermined distance from station to station at periodic intervals. In order to prevent an accumulation of such elements at a particular station and the attendant slow-down or tie up of the assembly line, the conveying apparatus or means is generally controlled to move an element to a station only when the preceding element has left the same. Similarly, the conveying means is normally controlled such that it will not operate to move between the stations unless an element is present to be moved. Such automatic control in the operation of a conveying means is justified to eliminate the excessive cost of such shut-down of associated equipment in a production line and the hold up of work on the same. In the past mechanical switching elements have been utilized to detect the presence of an object or element at a particular station. Because physical contact takes place between the element and the switching device such equipment has been designed to be extremely rugged and quite expensive and yet extremely high maintenance costs are required to assure continuity in operation of the assembly line equipment.

The present invention is directed to apparatus for sensing the presence of an article or element which is made of a material having magnetic or electrically conductive properties to eliminate mechanical contact between the switching mechanism and the element in the control of a conveyance line or similar apparatus and to eliminate the switch or electrical contacts of the sensing device. With the elimination of the mechanical contact and electrical contacts, there is an elimination of wear and breakage of the switching mechanism and an unlimited increase in reliability of the apparatus. My improved apparatus is also designed to respond only to the presence of the article or unit in a particular position. While photoelectric and other noncontacting types of sensors have been utilized in the past these types of equipment have been far too expensive and too fragile for use in assembly lines and are not reliable for continuous operation. Thus, my improved apparatus operates as a contactless switch which without contact with a part or unit senses the presence of the same in a particular location to perform a switching operation.

Therefore, it is an object of my invention to provide an improved apparatus for detecting the presence of an article having magnetic or electrically conductive properties.

Another object of this invention is to provide an apparatus for detecting the presence of an article having magnetic or electrically conductive properties which is rugged and sensitive and yet requires no maintenance and possesses extreme reliability.

It is further an object of this invention to provide an apparatus of this type which is sensitive to the presence of a part having magnetic or electrically conductive properties in a particular location and is insensitive to other magnetic particles at other locations.

It is still further an object of this invention to provide an improved apparatus of this type which will respond to the presence of an article of a particular size which will be insensitive to presence of small particles of magnetic material or other small magnetic parts which may be exposed to the same.

It is further an object of this invention to provide in an improved apparatus of this type an arrangement by means of which a build-up of magnetic particles on the face of the sensing device is prohibited.

These and other objects of this invention will become apparent from a reading of the attached description together with the drawings wherein:

Figure 4 is the conventional embodiment.

Figure 1:
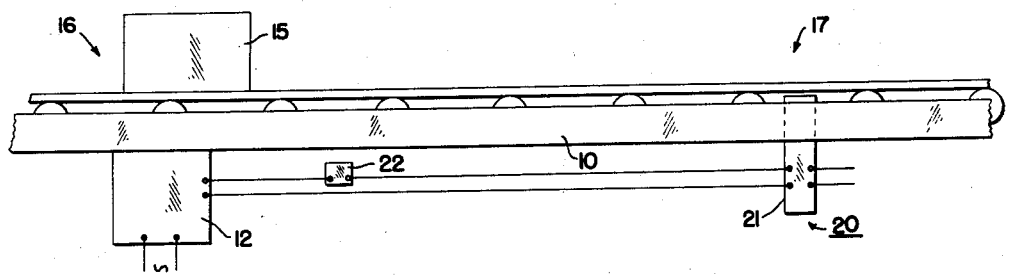
Figure 1 is a schematic disclosure of the improved apparatus of the subject invention in connection with a conveyance line handling magnetic parts.

My improved apparatus for sensing the presence of an article having magnetic or electrically conductive properties is shown schematically in Figure 1 in connection with a schematic disclosure of an assembly line having a conveyance means indicated generally at 10 with a motivating device 12 designed to convey a part or article indicated generally at 15 between stations along the assembly line. The positions indicated at 16 and 17 indicate two such stations along the line between which such parts or articles are to be moved periodically. The improved apparatus for sensing or detecting the presence of the article having magnetic or electrically conductive properties is indicated schematically at 20 at station 17 which sensing device will respond upon the presence of the article at station 17 with one type of response or which will indicate a different type of response upon the absence of the part 15 at that point. This sensing device or apparatus will control a relay mechanism indicated at 22 which is normally remote from the main line, the relay mechanism in turn controlling the motivating device 12 to advance the part between stations upon a given set of conditions. While relay mechanism 22 and motor 12 are shown here schematically as electrical devices the relay mechanism may be an electrical contactor or an electro pneumatic or hydraulic controller which will operate an electric pneumatic or hydraulic motor device. The disclosure in Figure 1 is schematic and shows only two sets of stations with a single set of equipment but it is to be understood that a number of stations will normally be utilized and a plurality of sets of equipment will be utilized to control the motors of the conveyance means. Further, it should be understood that the relay mechanisms 22 and conveyancing motors 12 will be interconnected along the way to perform various operations in the advancement of the article along the conveyance line. These details are omitted here since they form no part of the subject invention, and the present disclosure is intended to be illustrative only in a use which may be made of the improved apparatus.

Figure 2:
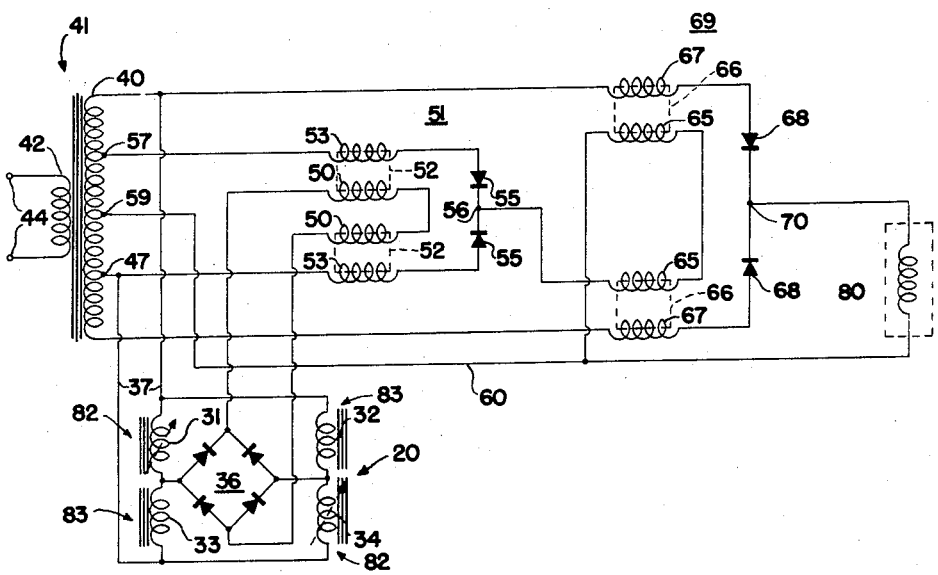
Figure 2 is a schematic circuit disclosure of the improved apparatus of the subject invention.

Figure 2 discloses a schematic circuit diagram of our improved apparatus in which the sensor 20 housed in a support or base 21 is comprised of a bridge circuit formed of four inductance coils 31–34 having a full wave rectifier 36 connected across the output diagonals of the bridge circuit and having conductors 37 connecting the input diagonals of the bridge circuit to a portion of the secondary winding 40 of an energizing transformer 41 whose primary winding 42 is adapted to be connected to an alternating current source of power indicated at 44. The energizing circuit for the inductor bridge circuit includes a tap 47 of secondary winding 40 and one extremity of the secondary winding. The output of the full wave rectifier 36 is connected in series with a pair of control windings 50 positioned on a pair of reactor cores indicated at 52 forming a first stage of amplification 51. The reactor cores include anode or power windings 53 which are connected through half wave rectifiers 55 to a common point 56 with the opposite extremities of the power windings 53 being connected to tap 47 and a tap 57 of secondary winding 40 of the energizing supply. This arrangement provides the well-known self-saturating magnetic amplifier circuit. A center tap 59 of the secondary winding 40 is connected through a conductor 60 to a pair of control windings 65 serially connected and connected to the center tap or common point 56 of a first reactor output circuit to provide a conventional load type circuit for the first stage of amplification or preamplifier stage. The control windings 65 are mounted on a second pair of reactor cores 66 forming a second stage 69 of magnetic amplification which includes power windings 67 which are connected to the extremities in the secondary winding 40 to provide a higher level of energization and through rectifiers 68 connected in opposition to one another and to a common point 70. The output circuit for the second stage of amplification 69 includes the common connection 70 and the coil or load device indicated at 80 of the relay mechanism 22 which is connected to the connector 60 and the center tap 59 of the secondary winding 40 providing a conventional return or load circuit for the second stage of amplification which is also of the self-saturating type. Coil 80 indicated in a block form in phantom is designed to be the coil of an operating relay mechanism which would perform the ultimate switching or controlling function in response to bridge unbalance of the sensor 20. Although no specific core configurations are shown for the reactors forming the first and second stages of amplification it will be recognized that any type of core may be utilized. I have found that each half of the amplifier may be placed on a continuous core member such as a rectangular or toroidal shaped core with each half of each of the amplifiers being magnetically separate and distinct from one another. It will be recognized that other core configurations may be utilized such as a three legged core with a common return path in which case the single control winding may be utilized in a conventional manner, to form a conventional full wave amplifier such as disclosed herein. The core configuration for the sensor 20 is shown in Figure 3 and is omitted in Figure 2 for simplicity purposes.

Figure 3:
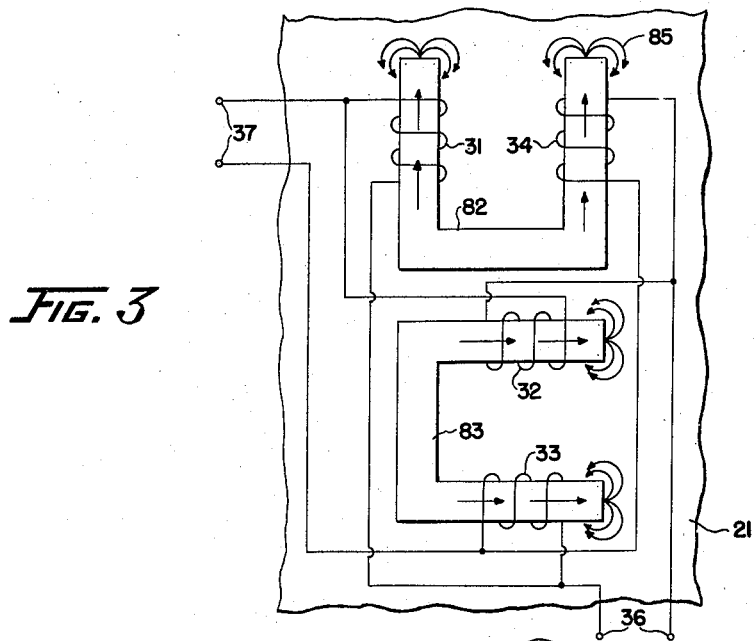
Figures 3 and 4 are schematic disclosures of a sensor, in which Figure 3 discloses the preferred arrangement or embodiment of the invention
Figure 4:
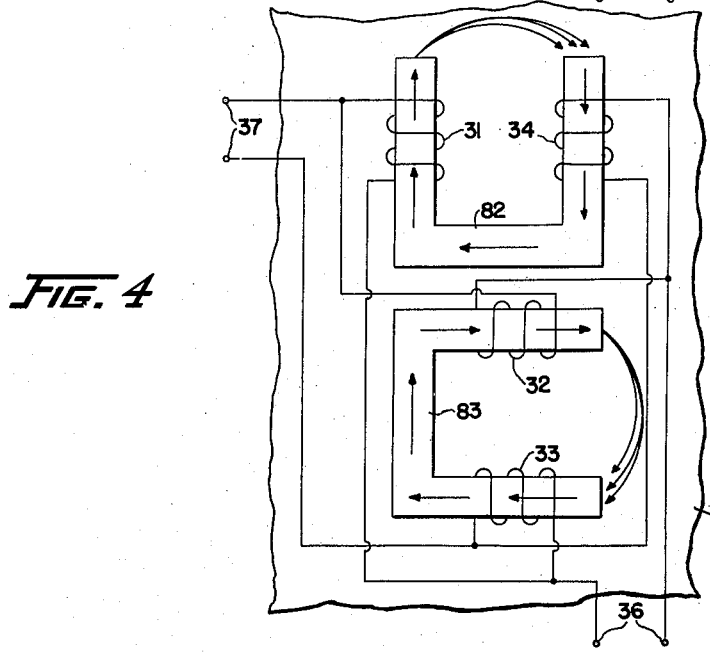

In Figure 3, diametrically opposed windings of the bridge such as 31, 34, and 32, 33 respectively are mounted on the same core, which are shown in Figures 3 and 4 as a C-shaped member indicated at 82 and 83 respectively. The windings 31 and 34 are so positioned on the core that the current flow therethrough in the bridge circuit will generate flux lines which are in opposition as shown in Figure 3. Thus the flux lines indicated schematically at 85 are directed out from the pole faces of the open C-shaped core structure. The windings 32 and 33 positioned on the core 83 are similarly connected such that the flux generated therein by the coils are in opposition. The core 82 is designed to be positioned on a frame or support 21 and the support 21 will be mounted with the pole faces of core 82 exposed to or adjacent to the surface along which the magnetic part can be detected travels. The core 83, also mounted on support 21, is positioned normal to the core 82, that is the pole extensions and the pole faces are positioned in a plane normal to the plane of the pole faces and core extensions of the core 82 and below the same such that the magnetic part will be remote from and out of influence from the flux lines generated in the core 83. The cores 82, 83 may however be positioned such that the pole extension extends in opposite directions. Where articles having magnetic properties are to be sensed the positioning of a part of magnetic material is adjacent the pole faces of the core 82 will alter the ratio of air to iron in the magnetic circuit and change the inductance of the coils 31, 34 respectively to unbalance the bridge circuit 20. The core 83 is so positioned with respect to the core 82 that its pole faces are remote therefrom and core 83 will not be affected by the presence of the magnetic part adjacent to pole faces of the core 82 and the inductance of the coils thereon will remain unchanged. With the absence of a part adjacent the pole faces of the core 82, the inductance of all of coils are the same and the bridge is in a balanced condition. The positioning of the core 82 below the core 83 and in the same frame will place it remote from the articles having magnetic properties which are passed along the conveyance line and hence away from any extraneous or moveable parts which may be indiscriminately brought into proximity with the device such that it will not be affected by such parts to give an erroneous switch operation.

Where the articles to be sensed are comprised wholly or in part of electrically conductive material, exclusive to any magnetic material, the same apparatus is utilized. The presence of the electrically conductive material presents an electrical circuit which is traversed or threaded by the flux from the emanating cores of the bridge sensing unit setting up eddy currents in the electrically conductive material which generate their own magnetic field. This second magnetic field interacts with that from the bridge circuit and modifies the permeability of the magnetic circuit of the core to alter the electrical characteristics of the coils thereon and unbalance the bridge circuit associated therewith such that an output is obtained therefrom. The remote core is unaffected by the presence of the article, the same as with the article of magnetic material and is so positioned as to be unaffected by parts or tools indiscriminately brought into proximity with the sensing apparatus.

The bridge arrangement and core configuration of Figure 4 is identical with that of Figure 3 with the exception that the coils 31, 34, 32 and 33 are so positioned on the core members 82 and 83 as to direct the flux in aiding relationship within the core. This disclosure is the conventional way of positioning coils on inductance cores and points out the distinction between the embodiment of the invention and the conventional arrangement. On conveyance lines it is a common occurrence to have magnetic particles such as filings and stray parts, such as screws and nuts, to be present along the working path or conveying path. With the conventional coil configuration, the flux lines would be so generated between the pole faces as to attract these parts to and between the exposed pole faces of the core 82 wherein an accumulation of such parts might build up to give an erroneous indication of the presence of a part or magnetic element when such was not desired. With the flux lines directed away from the pole faces of the core in the arrangement of the present invention, the build up of such magnetic particles or parts between the pole faces of the cores is prevented such that the sensing bridge will always be in condition to respond only to the presence of the part on the conveying line and will not provide a false indication.

In operation, the inductance sensing bridge is normally balanced with the absence of a part of magnetic material or electrically conductive material in proximity with the pole faces of the core 82. When an object is passed over the active poles of the transducer or inductance bridge an output voltage is obtained therefrom which is fed through the full wave rectifier 36 across the output diagonals thereof. The first stage of amplification of the magnetic amplifier controlled by the bridge type transducer is a preamplifying section and is normally self-saturated. When an output is obtained from the full-wave rectifier, the output will turn off the first stage of amplification. This will allow the second or power stage of the magnetic amplifier to saturate inasmuch as the control windings 65 thereof are normally receiving current from the saturated preamplifier stage. With the saturation of the power stage of the amplifier, an output current will appear from the power windings 67 and the control relay or load device 80 connected therewith will be energized therefrom. When the object is removed from across the active elements of the transducer the first stage or pre-amplifier stage is again allowed to self-saturate and thus drive the second stage or power stage down in saturation to de-energize the relay associated therewith. I have found that this conventional full wave two stage amplifier can, by proper adjustment of its electrical characteristics, provide a desirable switching or lock-up type of operation. By utilizing a transformer with conventional to poor transformer regulation and with the coils properly poled for full wave operation, a second harmonic effect in the control windings of the amplifier and poor regulation in the transformer will provide this desirable switching or lock-up operation. In this type of operation, the voltage of the excitation transformer and the voltage induced in the control winding of the second stage of the amplifier are additive and when the first stage is effectively turned off by the presence of control current in its control windings the second stage begins to turn on. A decrease in voltage drop across the power winding of the second stage due to an increase in load voltage drop occurs reducing the voltage fed back to the control winding of the second stage and accelerating this lock-up condition. While this type of operation is desirable in the present apparatus to provide positive switching action and elimination of armature chatter on the power controller of the motor, it is normally not feasible for conventional amplifier operation. However, it should be recognized that my improved apparatus may be successfully operated with a conventional amplifier of the proportioning type.

Thus it will be seen that our improved apparatus for detecting the presence of an object having magnetic or electrically conductive properties will provide a structure which is rugged and utilizes no moving parts yet is extremely sensitive and reliable and will require no maintenance. Further, the apparatus will prevent the build up of any extraneous magnetic particles on the surface of the sensing element which might disturb or provide a false indication therefrom.

I claim as my invention:

1. Apparatus for indicating the presence of an object having magnetic properties comprising, a transducer including an inductance bridge circuit having four inductance coils two of which are positioned on legs of a first U-shaped core member and the remaining similarly mounted on the legs of a second U-shaped core member, each of said coils in said bridge circuit being positioned on opposite sides of said bridge circuit from the coil mounted on the same core member and being energized such that the magnetic flux field is generated and directed away from said pole faces of said core member for each coil, means mounting the core members of said transducer such that the faces of the core members are positioned remote from one another and so that the object whose presence is to be sensed may be brought into proximity with the face of only one of said core members, circuit means energizing said inductance bridge circuit, and means connected to said inductance bridge circuit and responsive to the unbalance of said bridge circuit.

2. Apparatus for indicating the presence of an object having magnetic properties comprising, a transducer including an inductance bridge circuit having four inductance coils two of which are positioned on legs of a first discontinuous core member having pole faces at the extremities thereof and the remaining similarly positioned on the legs of a second discontinuous core member, each of said coils in said bridge circuit being positioned on opposite sides of said bridge circuit from the coil mounted on the same core member and being energized such that the magnetic flux field is generated and directed away from said pole faces of said core member for each coil, means mounting the core members of said transducer such that the faces of the core members are positioned remote from one another and so that the object whose presence is to be sensed may be brought into proximity with the face of only one of said core members, circuit means energizing said inductance bridge circuit, and means connected to said inductance bridge circuit and responsive to the unbalance of said bridge circuit.

3. Apparatus for indicating the presence of an object having magnetic properties at a predetermined point along a conveyance line comprising, a transducer including an inductive bridge circuit having coils on opposite sides of said bridge circuit mounted on legs of a pair of U-shaped core members respectively whose extremities define pole faces lying in the same plane and defining an air gap therebetween, means connecting said coils on said bridge circuit such that the flux fields adapted to be generated therein oppose and are directed toward said air gap, circuit means connected to said bridge circuit for energizing the same, output means for said bridge circuit, means mounting said U-shaped core members such that the pole faces of one core member are positioned in a plane normal to the pole faces of the other core member, means positioning said mounting means such that the air gap of one core member is located at the predetermined point on the conveyance line, and means connected to said output means and responsive to unbalance of said bridge circuit upon the presence of the object at the predetermined point.

4. Apparatus for indicating the presence of an object having magnetic properties at a predetermined point along a conveyance line comprising, a transducer including an inductive bridge circuit having coils on opposite sides of said bridge circuit mounted on legs of a pair of discontinuous core members respectively whose extremities define pole faces lying in the same plane and defining an air gap therebetween, means connecting said coils on said bridge circuit such that the flux fields adapted to be generated therein oppose in and are directed toward said air gap, circuit means connected to said bridge circuit for energizing the same, output means for said bridge circuit, means mounting said discontinuous core members such that the pole faces of one core member are positioned in a plane normal to the pole faces of the other core member, means positioning said mounting means such that the air gap of one core member is located at the predetermined point along the conveyance lines, and means connected to said output means and responsive to unbalance of said bridge circuit upon the presence of the object at the predetermined point.

5. Apparatus for indicating the presence of an object at a predetermined point along a conveyance line comprising, a transducer including an inductive bridge circuit having coils on opposite sides of said bridge circuit mounted on legs of a pair of U-shaped core members respectively whose extremities define pole faces lying in the same plane and defining an air gap therebetween, means connecting said coils on said bridge circuit such that the flux fields adapted to be generated therein oppose and are directed toward said air gap, circuit means connected to said bridge circuit for energizing the same, output means for said bridge circuit, means mounting said U-shaped core members such that the pole faces of one core member are positioned remote from the pole faces of the other core member, means positioning said mounting means such that the air gap of one core member is located at the predetermined point on the conveyance line, and means connected to said output means and responsive to unbalance of said bridge circuit upon the presence of the object at the predetermined point.

6. Apparatus for indicating the presence of an object at a predetermined point along a conveyance line comprising, a transducer including an inductive bridge circuit having coils on opposite sides of said bridge circuit mounted on legs of a pair of discontinuous core members respectively whose extremities define pole faces lying in the same plane and defining an air gap therebetween, means connecting said coils on said bridge circuit such that the flux fields adapted to be generated therein oppose in and are directed toward said air gap, circuit means connected to said bridge circuit for energizing the same, output means for said bridge circuit, means mounting said discontinuous core members such that the pole faces of one core member are positioned remote from the pole faces of the other core member, means positioning said mounting means such that the air gap of one core member is located at the predetermined point along the conveyance lines, and means connected to said output means and responsive to unbalance of said bridge circuit upon the presence of the object at the predetermined point.

7. Apparatus for indicating the presence of an object at a predetermined point along a conveyance line comprising, a transducer including an inductive bridge circuit having coils on opposite sides of said bridge circuit mounted on legs of a pair of discontinuous core members respectively whose extremities define pole faces lying in the same plane and defining an air gap therebetween, means connecting said coils on said bridge circuit such that the flux fields adapted to be generated therein oppose in and are directed toward said air gap, circuit means connected to said bridge circuit for energizing the same, output means for said bridge circuit, means mounting said discontinuous core members such that the extremities are directed in opposite directions, means positioning said mounting means such that the air gap of one core member is located at the predetermined point along the conveyance lines, and means connected to said output means and responsive to unbalance of said bridge circuit upon the presence of the object at the predetermined point.

References Cited in the file of this patent
UNITED STATES PATENTS

| | | |
|---|---|---|
| 1,896,737 | Zuschlag | Feb. 7, 1933 |
| 2,531,414 | Engvall | Nov. 28, 1950 |
| 2,706,800 | Bubb | Apr. 19, 1955 |